US011640603B1

(12) United States Patent
Freire

(10) Patent No.: US 11,640,603 B1
(45) Date of Patent: May 2, 2023

(54) SYSTEM AND METHOD FOR CRYPTO TOKEN LINKED ASSETS

(71) Applicant: Joseph Freire, Long Beach, CA (US)

(72) Inventor: Joseph Freire, Long Beach, CA (US)

(*) Notice: Subject to any disclaimer, the term of this patent is extended or adjusted under 35 U.S.C. 154(b) by 0 days.

(21) Appl. No.: 17/529,675

(22) Filed: Nov. 18, 2021

(51) Int. Cl.
*G06Q 20/38* (2012.01)
*G06Q 20/40* (2012.01)
*G06Q 20/10* (2012.01)
*G06Q 50/34* (2012.01)

(52) U.S. Cl.
CPC ..... *G06Q 20/38215* (2013.01); *G06Q 20/102* (2013.01); *G06Q 20/3825* (2013.01); *G06Q 20/3827* (2013.01); *G06Q 20/4014* (2013.01); *G06Q 50/34* (2013.01); *G06Q 2220/18* (2013.01)

(58) Field of Classification Search
CPC ..... G06Q 20/00–425; G06Q 50/00–34; G06Q 2220/00–18
See application file for complete search history.

(56) References Cited

U.S. PATENT DOCUMENTS

| | | | | |
|---|---|---|---|---|
| 6,119,229 A * | 9/2000 | Martinez | ............. | G06Q 20/047 726/28 |
| 8,484,091 B2 * | 7/2013 | Wright | ............. | G06Q 30/0239 705/26.1 |
| 11,126,698 B2 * | 9/2021 | Vaish | ............. | G06F 21/105 |
| 11,258,587 B2 * | 2/2022 | Diehl | ............. | H04L 9/30 |
| 2020/0005284 A1 * | 1/2020 | Vijayan | ............. | G06F 16/1837 |
| 2020/0273048 A1 * | 8/2020 | Andon | ............. | G06F 16/2379 |
| 2020/0278963 A1 * | 9/2020 | Destefanis | ............. | G06F 16/1837 |
| 2020/0342539 A1 * | 10/2020 | Doney | ............. | G06Q 20/367 |
| 2021/0004923 A1 * | 1/2021 | Mackenzie | ............. | G06F 16/27 |
| 2021/0248214 A1 * | 8/2021 | Goldston | ............. | H04L 9/3239 |

OTHER PUBLICATIONS

Gatto, J., Article on "NFT License Breakdown: Exploring Different Marketplaces and Associated License Issues", Sep. 21, 2021 (Year: 2021).*
Nifty Options Official, Article on "Introducing: NiftyOptions-Ethereum's First NFT Options Protocol", Sep. 24, 2021 (Year: 2021).*
Aksoy et al. "NFTs and copyright: challenges and opportunities," Journal of Intellectual Property Law & Prce, 2021, vol. 16, No. 10, Jun. 21, 2021 (Year: 2021).*

* cited by examiner

*Primary Examiner* — John W Hayes
*Assistant Examiner* — Chenyuh Kuo
(74) *Attorney, Agent, or Firm* — The Iwashko Law Firm, PLLC; Lev Ivan Gabriel Iwashko

(57) ABSTRACT

A system for crypto token linked assets in at least one of a game, a fantasy sport, and a wagering opportunity, the system including a token server storing at least one transaction of at least one licensor crypto token over a network, the token server being programmed to create proof of ownership for at least one of a unique digital asset and a unique physical asset of at least one licensor, analyze the at least one transaction, and associate the at least one licensor to the at least one licensor crypto token, at least one licensor apparatus being programmed to generate and distribute the at least one licensor crypto token, and send the at least one licensor crypto token to the token server, and at least one licensee apparatus being programmed to request use of the at least one licensor crypto token on the token server, and obtain a license to use the at least one licensor crypto token in response to completing the at least one transaction.

32 Claims, 3 Drawing Sheets

SYSTEM AND METHOD FOR CRYPTO TOKEN LINKED ASSETS

BACKGROUND

1. Field

The present general inventive concept relates generally to non-fungible tokens or similar digital cryptographic tokens used as proof of ownership for an asset, and particularly, to a system and method for licensed tokenized assets.

2. Description of the Related Art

Fantasy sports are popular games that allow participants to play as an owner and/or a manager of a virtual professional sports team. Typically, the participant will start a draft to select players for their own team based on real players on a professional sports team. Points are awarded to the participants based on performance and/or statistics of the real players in real-world competition.

Games, fantasy sports contests, and/or wagering opportunities have used digital persons, players, and/or teams as proxies for real persons or teams. The creators of games or the sponsors of fantasy sports contests and/or wagering opportunities have created and/or used proxy players with or without license, or permission of real persons, players and/or teams.

The participants may or may not agree to wager (play for money) on the various outcomes related to a game, or the individual, or collective performance, of a player, group of players, team, group of teams or league, for a single game, a parley of games or a season. Regardless of whether money is used, scoring is set prior to the participants beginning play. For example, in fantasy football, the participants may earn points if one of their players completes a touchdown, recovers a fumble, and/or runs over twenty-five yards.

Computers use programming-generated scripts called tokens to pass data between computing devices, systems, and/or network nodes. Tokens are issued in many forms and are used for a broad array of applications, especially when information and transactions pass between computing devices. The primary purpose of tokens is to standardize data configurations and enhance network or transaction security with authentication protocols. Since tokens are computer programs, they are capable of executing instructions and requiring that certain conditions be precedent before a successful transaction is process. Transaction security is increased when tokens employ cryptographic functions or use cryptographic keys. Cryptographically enabled tokens are referred to as crypto tokens and they are typically used to execute secured transactions. Crypto tokens include cryptocurrencies, non-fungible tokens (NFTs) and other computer-generated encrypted tokens ("crypto tokens"). Crypto tokens are programmatically created by computer systems and are capable of being distributed and used by a single computer server, a network of computers, an array of interconnected computers, or a distributed multi-node network of computer devices called a blockchain, any of which may be referred to as a token server when creating or distributing crypto tokens.

The blockchain is a highly secure computer network due to the fact that every node records and confirms transactions. Since every node participates in the transaction, altering and/or tampering with data is near impossible. However, the blockchain is susceptible to network processing latency due to each node being an active participant. Moreover, the blockchain is difficult to scale (e.g., grow in size).

The blockchain and bitcoin is believed to have originated in 2008 by a person or persons using the name or pseudonym Satoshi Nakamoto. The blockchain was intended as a public transaction ledger for bitcoin, which is known as the first cryptocurrency. Bitcoin provides a peer-to-peer electronic cash system that circumvents the need for a central bank, an administrator, and/or a government overseer.

Bitcoin has a limited supply, which increases the value of each bitcoin. Bitcoins are mined by solving complex computational problems to discover a nonce (i.e., a random number used once in cryptographic communication and/or authentication to prevent reuse), which is a moving target. The target changes based on the network's performance. In other words, the solution for each problem changes, which makes mining for bitcoin extremely difficult. For example, between March 2014 and March 2015, the average number of nonces used by miners to create a new block in the blockchain increased from 16.5 quintillion to 200.5 quintillion. Any successful mining of bitcoin is known as a "proof of work" and results in miners being awarded a fixed number of bitcoins.

NFTs are standardized under Ethereum Request for Comments 721 (ERC-721). Each NFT acts as a proof of ownership, similar to the title of a car or real property, for a unique, one-of-a-kind asset being either physical or digital. By transacting NFTs related to their underlying unique assets those assets can be bought, sold, traded, and/or gifted. Some collectible NFT assets are issued as editions. For example, there are collectible sports trading cards issued in collectible tiers, such as common tier, rare tier, and legendary tier. The legendary tier may have less than five hundred editions, whereas the common tier may have over ten thousand editions for different sports memorabilia.

Currently, NFT transactions encounter various problems, which impede adoption for use in transactions. Some of the problems with NFT transactions include complex computing methods, long settlement times, high transaction costs, uncertain future direction, economic risk, and/or experimental application. In particular, the requirement for each network node to confirm the transaction results in substantial delays before settlement. Also, transactions incur processing fees using a digital monetary concept referred to as "gas." Gas is expensive during high volume transaction periods over the blockchain. Also, each time a new block is added, it decreases the available space for how many transactions may occur. The aforementioned limitations contribute to the increasing cost of gas and processing latency.

NFT transactions often take place on an NFT marketplace. Physical assets are quickly replaced by digital assets to be linked to NFTs. The NFT market is currently estimated at approximately $2.5 billion and is expected to continue rapid growth as new applications are discovered. Also, the market for digital art has increased 800% in 2021. One famous work of digital art was created by a professional digital artist known as Beeple who created a collage of his past works and named it, "EVERYDAYS: THE FIRST 5000 DAYS." This digital art piece was sold on auction for a substantial sum of over $69.3 million. These figures only underscore the growing popularity of crypto tokens and some of their potential applications.

Where license and royalty agreements exist, they generally relate to the initial revenue and/or scheduled recurring revenue generated by the game, fantasy sports contest, and/or wagering opportunity. In other words, real owners and/or the real players often have no way to manage use of their name, likeness, and/or identity in fantasy sports and/or games by participants in those games. As such, the real owners and/or the real players lose out on a source of substantial revenue.

Therefore, there is a need for a system and method for crypto token linked assets that ensures management of identities by the real entities (players, persons, teams, leagues, etc.) and provide a recurring monetary benefit or royalties for the real entities when consideration is exchanged between parties during transactions involving assets linked to the identity of the real entity.

SUMMARY

The present general inventive concept provides a system and method for licensed tokenized assets.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a system for crypto token linked assets in at least one of a game, a fantasy sport, and a wagering opportunity, the system including a token server, which may be a standalone compute platform, a third party compute platform sometimes referred to as a token, crypto or asset marketplace, or one of a similar function capable of performing as a crypto token exchange and/or transaction apparatus, or a blockchain node capable of creating or distributing crypto tokens, any of which are storing at least one transaction of at least one licensor crypto token over a network, the token server being programmed to create proof of ownership for a unique digital or physical asset of at least one licensor, analyze the at least one transaction, and associate the at least one licensor to the at least one licensor crypto token, at least one licensor apparatus being programmed to generate and distribute the at least one licensor crypto token, and send the at least one licensor crypto token to the token server, and at least one licensee apparatus being programmed to request use of the at least one licensor crypto token on the token server, and obtain a license to use the at least one licensor crypto token in response to completing the at least one transaction.

The token server may be further programmed to receive the at least one licensor crypto token as at least one of a non-fungible token or similar digital cryptographic token and a cryptocurrency.

The at least one licensor apparatus may be further programmed to link the at least one licensor crypto token to the digital or physical asset of the at least one licensor.

The digital or physical asset linked to the at least one licensor crypto token may be at least one of a name of the at least one licensor, an image of the at least one licensor, a sport of the at least one licensor, a jersey of the at least one licensor, a sport equipment of the at least one licensor, a signature of the at least one licensor, a video of the at least one licensor, a meme of the at least one licensor, a card of the at least one licensor, a description of the at least one licensor, a voice or video recording of the at least one licensor, and/or any unique asset associated with the at least one licensor.

The at least one licensor apparatus may be further programmed to associate a licensor identification and/or asset with the at least one licensor crypto token.

The at least one licensee apparatus may be further programmed to gain access to use the digital or physical asset of the at least one licensor in at least one of the game, the fantasy sport, and the wagering opportunity in response to obtaining the license for the at least one licensor crypto token.

The token server may be further programmed to automatically set the price for the at least one licensor crypto token based on at least one of popularity, rank, demand, and usage.

The token server may be further programmed to grant use of the at least one licensor crypto token based on at least one of an account, a website address, a name, a phone number, a media access control address, and a serial number of the at least one licensee apparatus.

The token server may be further programmed to require a subscription fee for continued use of the at least one licensor crypto token after expiration of a predetermined period of time.

The token server may be further programmed to transfer funds and royalties to the at least one licensor apparatus in response to completion of the at least one transaction between the at least one licensor apparatus and the at least one licensee apparatus.

The at least one licensee apparatus may be further programmed to store the at least one licensor crypto token in a digital wallet.

The system may further include a blockchain comprising a plurality of nodes on a distributed network, the blockchain connected to the token server, the at least one licensor apparatus, and the at least one licensee apparatus and programmed to store the at least one transaction using a cryptographic hash on each of the plurality of nodes.

The blockchain may be further programmed to regulate distribution of the at least one licensor crypto token.

The blockchain may be further programmed to execute a smart contract to automatically resolve the at least one transaction.

The blockchain may be further programmed to require the smart contract to adopt legal and the at least one licensor requirements for an option contract, such that the at least one licensor apparatus keeps the at least one licensor crypto token available for the at least one licensee apparatus for a specified period of time in response to the at least one licensor apparatus paying for the specified period of time.

The blockchain may be further programmed to use at least one of a second routing layer and other computing, storage or routing method to increase transaction speeds.

The blockchain may be further programmed to use block sizes larger than thirty-two megabytes to reduce transaction fees and increase available space for transactions.

The blockchain may be further programmed to require the at least one licensee apparatus to accept a predetermined condition prior to resolving the at least one transaction.

The blockchain may be further programmed to require the at least one licensee apparatus making an agreement not to perform at least one of trade, transfer, exchange, and sell the at least one licensor crypto token being purchased.

The blockchain may be further programmed to perform at least one of void the at least one transaction, remove privileges to use the at least one licensor crypto token, and ban future use of the token server in response to the at least one licensee apparatus breaking the agreement.

The foregoing and/or other features and utilities of the present general inventive concept may also be achieved by providing a method for using crypto token linked assets in at least one of a game, a fantasy sport, and a wagering opportunity, the method including storing, on a token server, at least one transaction of at least one licensor crypto token over a network, the token server being programmed for the steps of creating proof of ownership for a unique digital or physical asset of at least one licensor, analyzing the at least one transaction, and associating the at least one licensor to the at least one licensor crypto token, generating and distributing, from at least one licensor apparatus, the at least one licensor crypto token, sending, from the at least one licensor apparatus, the at least one licensor crypto token to the token server, requesting, from at least one licensee apparatus, use of the at least one licensor crypto token on the token server, and obtaining, by the at least one licensee apparatus, a license to use the at least one licensor crypto token in response to completing the at least one transaction.

The method may further include receiving, via the token server, the at least one licensor crypto token as at least one of a non-fungible token and a cryptocurrency.

The method may further include linking, via the at least one licensor apparatus, the at least one licensor crypto token to the asset of the at least one licensor.

The digital or physical asset linked to the at least one licensor crypto token may be at least one of a name of the at least one licensor, an image of the at least one licensor, a sport of the at least one licensor, a jersey of the at least one licensor, a sport equipment of the at least one licensor, a signature of the at least one licensor, a video of the at least one licensor, a meme of the at least one licensor, a card of the at least one licensor, a description of the at least one licensor, a voice or video recording of the at least one licensor, and/or any unique asset associated with the at least one licensor.

The method may further include associating, via the at least one licensor apparatus, a licensor identification with the at least one licensor crypto token.

The method may further include gaining access, via the at least one licensee apparatus, to use the digital or physical asset of the at least one licensor in at least one of the game, the fantasy sport, and the wagering opportunity in response to obtaining the license for the at least one licensor crypto token.

The method may further include automatically setting the price, via the token server, for the at least one licensor crypto token based on at least one of popularity, rank, demand, and usage.

The method may further include granting use, via the token server, of the at least one licensor crypto token based on at least one of an account, a website address, a name, an identifying code, a phone number, a media access control address, and a serial number of the at least one licensee apparatus.

The method may further include requiring, via the token server, a subscription fee for continued use of the at least one licensor crypto token after expiration of a predetermined period of time.

The method may further include transferring, via the token server, funds and royalties to the at least one licensor apparatus in response to completion of the at least one transaction between the at least one licensor apparatus and the at least one licensee apparatus.

The method may further include storing, via the at least one licensee apparatus, the at least one licensor crypto token in a digital wallet.

The method may further include storing on a blockchain the at least one transaction using a cryptographic hash on each of the plurality of nodes, such that the blockchain comprises a plurality of nodes on a distributed network, such that the blockchain is connected to the token server, the at least one licensor apparatus, and the at least one licensee apparatus.

The method may further include regulating, via the blockchain, distribution of the at least one licensor crypto token.

The method may further include executing, via the blockchain, a smart contract to automatically resolve the at least one transaction.

The method may further include executing, via the blockchain, requiring the smart contract to adopt legal and/or licensor requirements for an option contract, such that the at least one licensor apparatus keeps the at least one licensor crypto token available for the at least one licensee apparatus for a specified period of time in response to the at least one licensor apparatus paying for the specified period of time.

The method may further include using, via the blockchain, a second routing layer to increase transaction speeds.

The method may further include using, via the blockchain, block sizes larger than thirty-two megabytes to reduce transaction fees and increase available space for transactions.

The method may further include requiring, via the blockchain, the at least one licensee apparatus to accept a predetermined condition prior to resolving the at least one transaction.

The method may further include requiring, via the blockchain, the at least one licensee apparatus making an agreement not to perform at least one of trade, transfer, exchange, and sell the at least one licensor crypto token being purchased.

The method may further include performing, via the blockchain, at least one of void the at least one transaction, remove privileges to use the at least one licensor crypto token, and ban future use of the token server in response to the at least one licensee apparatus breaking the agreement.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Figure 1:
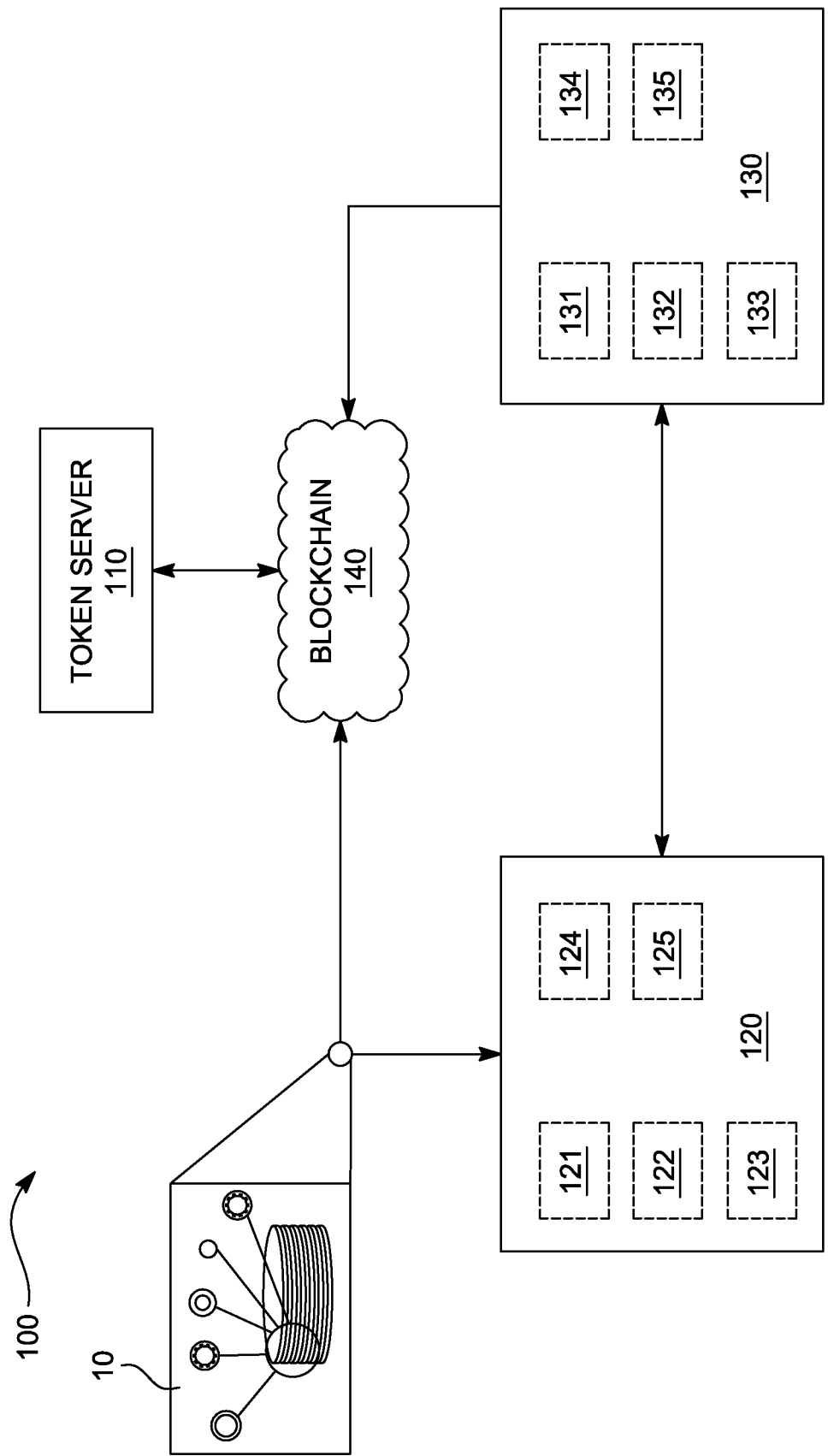
FIG. 1 illustrates a system to license tokenized assets, according to an exemplary embodiment of the present general inventive concept.

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

System 100
Token Server 110
Licensor Apparatus 120
Input Unit 121
Display Unit 122
Processing Unit 123
Communications Unit 124
Storage Unit 125
Licensee Apparatus 130
Input Unit 131
Display Unit 132
Processing Unit 133
Communications Unit 134
Storage Unit 135
Blockchain 140

FIG. 1 illustrates a system 100 to license tokenized assets, according to an exemplary embodiment of the present general inventive concept.

Figure 2:
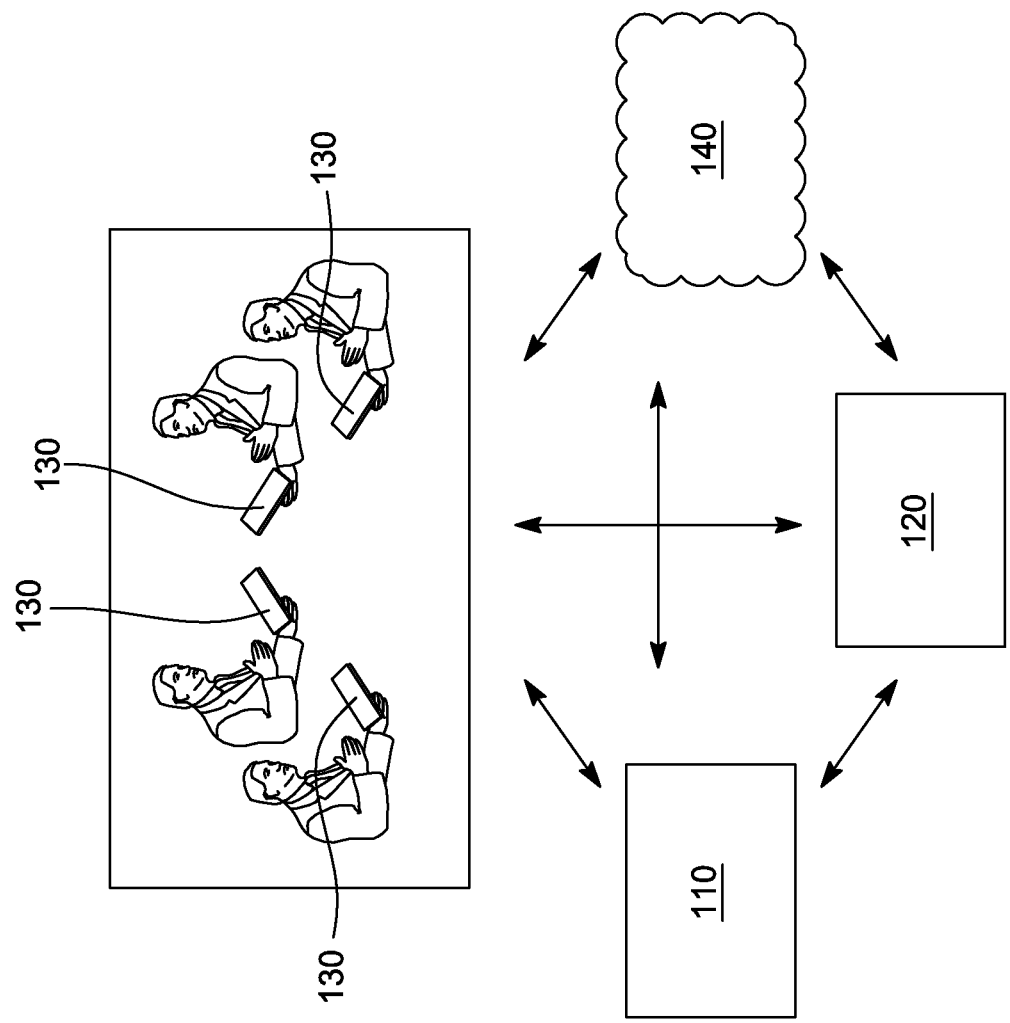
FIG. 2 illustrates a plurality of users participating in fantasy sports or games using licensed tokenized assets, according to an exemplary embodiment of the present general inventive concept.

FIG. 2 illustrates a plurality of users participating in fantasy sports or games using licensed tokenized assets, according to an exemplary embodiment of the present general inventive concept.

The system 100 may include a token server 110, at least one licensor apparatus 120, at least one licensee apparatus 130, and a blockchain 140, but is not limited thereto.

The token server 110 may be a standalone compute platform, a third party compute platform sometimes referred to as a token, crypto and/or asset marketplace, or one of a similar function capable of performing as a crypto token exchange and/or transaction apparatus, or a blockchain node capable of creating or distributing crypto tokens, any of which may include a computing device with a storage unit and a cloud-based storage space, or operating on the blockchain, but is not limited thereto. The token server 110 may store and/or execute a software program and/or an application running thereon to control, manage, monitor, and/or analyze tokens over a network. Additionally, the token server 110 may have a program running thereon to determine any transactions of at least one licensor crypto token 10 over the network, such as a non-fungible token (NFT), cryptocurrency, and/or any other computer-generated encrypted token. The token server 110 may use the crypto tokens 10 to create proof of ownership for unique digital and/or unique physical assets, thereby permitting the assets to be traded in a digital form rather than a physical form, such as a title or a bill of sale. As such, the token server 110 may store data regarding a transaction, such as between the at least one licensor apparatus 120 and/or the at least one licensee apparatus 130. The token server 110 may use cryptographic tokens (a.k.a., crypto tokens) that may be distributed by the token server 110 and/or any number of computing devices. As such, the token server 110 may comprise a plurality of token servers 110 over the network.

Therefore, each of the plurality of token servers 110 may operate independently of each other. For example, at least one of the plurality of token servers 110 may be part of the crypto and/or asset marketplace that handles trades of the at least one licensor crypto token 10.

Additionally, the at least one licensor apparatus 120 may be described as a computer device. For example, the at least one licensor apparatus 120 may be a mobile device, a smartphone, a cellphone, a smartwatch, a tablet, a personal digital assistant (PDA), a laptop computer, an electronic reader, a video game console, and a desktop computer, but is not limited thereto.

The at least one licensor apparatus 120 may include an input unit 121, a display unit 122, a processing unit 123, a communication unit 124, and a storage unit 125, but is not limited thereto.

The input unit 121 may include a keyboard, a touchpad, a mouse, a trackball, a stylus, a voice recognition unit, a visual data reader, a camera, a wireless device reader, a fingerprint reader, an iris scanner, a facial recognition unit, and a holographic input unit.

The display unit 122 may include a plasma screen, an LCD screen, a light emitting diode (LED) screen, an organic LED (OLED) screen, a computer monitor, a hologram output unit, a sound outputting unit, or any other type of device that visually or aurally displays data.

Also, the display unit 122 may be combined with the input unit 121 to be a touch-screen.

The processing unit 123 (or central processing unit, CPU) may include electronic circuitry to carry out instructions of a computer program by performing basic arithmetic, logical, control and input/output (I/O) operations specified by the instructions. The processing unit 123 may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The processing unit 123 may also include a microprocessor and a microcontroller. The processing unit 123 may be a local compute device, a remote server, or cloud computing device.

The communication unit 124 may include a device capable of wireless or wired communication between other wireless or wired devices via at least one of Wi-Fi, Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, USB, global positioning system (GPS), Firewire, and Ethernet.

The storage unit 125 may include a random access memory (RAM), a read-only memory (ROM), a hard disk, a flash drive, a database connected to the Internet, cloud-based storage, Internet-based storage, or any other type of storage unit.

The at least one licensor apparatus 120 may access the Internet via the communication unit 124 to allow at least one licensor to access a website, and/or may allow a mobile application and/or the software application to be executed using the processing unit 123. For ease of description, the mobile and/or the software application will be hereinafter referred to as an app. The app may be downloaded from the Internet, such as the token server 110, to be stored on the storage unit 125. In other words, the software application stored on the storage device 110 may be the same as the app stored on the storage unit 125 of the at least one licensor apparatus 120.

Figure 3:
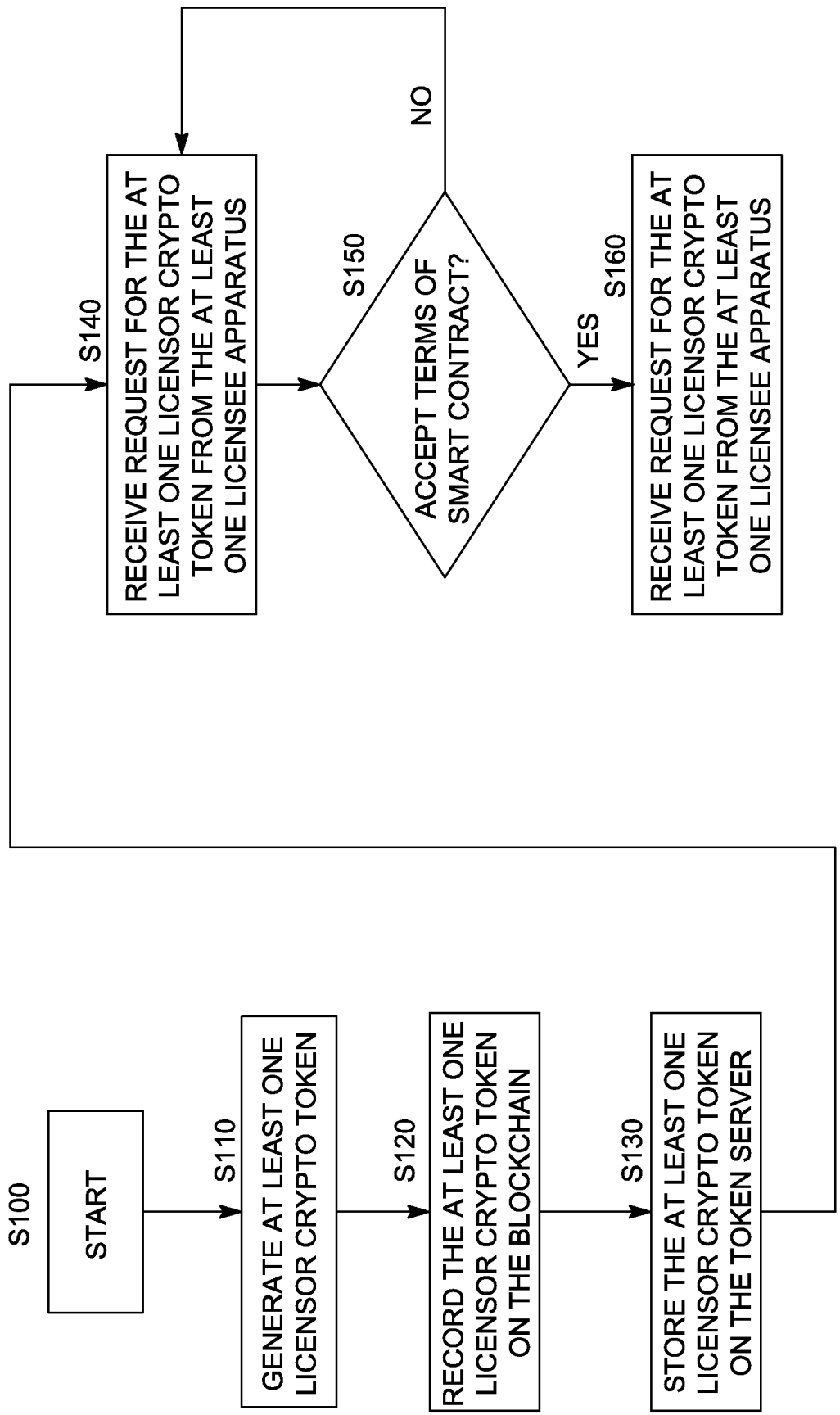
FIG. 3 illustrates a flowchart demonstrating acquisition of at least one licensor crypto token, according to an exemplary embodiment of the present general inventive concept.

FIG. 3 illustrates a flowchart demonstrating acquisition of at least one licensor crypto token, according to an exemplary embodiment of the present general inventive concept.

Beginning at S100, the at least one licensor apparatus 120 may use the app via the input unit 121 and/or the communication unit 124 to allow the at least one licensor to create, generate, manage, control, distribute, and/or remove at least one licensor crypto token 10 at step S110 based on a digital and/or physical asset. For example, the input unit 121 may receive a generate command into the app to generate the at least one licensor crypto token 10 that is linked to the digital and/or physical asset of the at least one licensor, such as a name of the at least one licensor, an image of the at least one licensor, a sport of the at least one licensor, a jersey of the at least one licensor, a sport equipment (e.g., a bat, a ball, a stick) of the at least one licensor, a signature of the at least one licensor, a video of the at least one licensor, a meme of the at least one licensor, a card of the at least one licensor, a description of the at least one licensor, a voice recording of the at least one licensor, a video recording of the at least one licensor, and/or any unique asset associated with the at least one licensor. Subsequently, the processing unit 123 may send the at least one licensor crypto token 10 to the token server 110 using the communication unit 124. As such, the token server 110 may store the at least one licensor crypto token 10.

Therefore, the at least one licensor crypto token 10 may also be considered a proxy for the at least one licensor.

The at least one licensee apparatus 130 may be described as a computer device. For example, the at least one licensee apparatus 130 may be a mobile device, a smartphone, a cellphone, a smartwatch, a tablet, a personal digital assistant (PDA), a laptop computer, an electronic reader, a video game console, and a desktop computer, but is not limited thereto.

The at least one licensee apparatus 130 may include an input unit 131, a display unit 132, a processing unit 133, a communication unit 134, and a storage unit 135, but is not limited thereto.

The input unit 131 may include a keyboard, a touchpad, a mouse, a trackball, a stylus, a voice recognition unit, a visual data reader, a camera, a wireless device reader, a fingerprint reader, an iris scanner, a facial recognition unit, and a holographic input unit.

The display unit 132 may include a plasma screen, an LCD screen, a light emitting diode (LED) screen, an organic LED (OLED) screen, a computer monitor, a hologram output unit, a sound outputting unit, or any other type of device that visually or aurally displays data.

Also, the display unit 132 may be combined with the input unit 131 to be a touch-screen.

The processing unit 133 (or central processing unit, CPU) may include electronic circuitry to carry out instructions of a computer program by performing basic arithmetic, logical, control and input/output (I/O) operations specified by the instructions. The processing unit 133 may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The processing unit 133 may also include a microprocessor and a microcontroller. The processing unit 133 may be a local compute device, a remote server, or cloud computing device.

The communication unit 134 may include a device capable of wireless or wired communication between other wireless or wired devices via at least one of Wi-Fi, Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, USB, global positioning system (GPS), Firewire, and Ethernet.

The storage unit 135 may include a random access memory (RAM), a read-only memory (ROM), a hard disk, a flash drive, a database connected to the Internet, cloud-based storage, Internet-based storage, or any other type of storage unit.

The at least one licensee apparatus 130 may access the Internet via the communication unit 134 to receive and/or update the app, as described above, to be executed using the processing unit 133. The app may be downloaded from the Internet and/or the token server 110 to be stored on the storage unit 135.

The blockchain 140 may include a database and a chain of computers connected in a cloud network, such that the blockchain 140 is a plurality of computer nodes on a distributed network. Moreover, the blockchain 140 may store blocks of data using cryptography, such that each block of data is a cryptographic hash of a previous block of data, a timestamp, and any transaction data. The blockchain 140 may regulate the distribution of crypto tokens 10 on the network. It is important to note that the blockchain 140 may use a variety of crypto tokens 10, such as cryptocurrencies (e.g., Bitcoin, Ethereum, Litecoin, SALT, DASH, Dogecoin, etc.), NFTs, and/or any other computer-generated crypto tokens.

In operation, the at least one licensor crypto token 10 generated by the processing unit 124 of the at least one licensor apparatus 120 may be sent to the blockchain 140 to create a new block of data prior to receipt and/or storing by the token server 110. Moreover, the at least one licensor apparatus 120 may associate a licensor identification (ID) with the at least one licensor crypto token 10 that is specific to the at least one licensor on the token server 110, the blockchain 140, and/or the network. Thus, the at least one licensor ID may prove ownership of the at least one licensor crypto token 10 by the at least one licensor.

Also, the token server 110 and/or the blockchain 140 may associate the licensor ID with the at least one licensor. As such, any licensor crypto tokens 10 generated, created, and/or modified by the at least one licensor apparatus 120 may mark the at least one licensor crypto token 10 with the licensor ID, such that the token server 110, the at least one licensor apparatus 120, the at least one licensee apparatus 130, and/or the blockchain 140 may identify an origin of the at least one licensor crypto token 10. Accordingly, the at least one licensor crypto token 10 and/or the licensor ID may not be modified and/or duplicated by a third party.

The at least one licensor apparatus 120 may create multiple crypto tokens 10 to be hosted on the token server 110. Additionally, the at least one licensor apparatus 120 may set a price for each licensor crypto token 10 located thereon. Alternatively, the token server 110 may automatically set the price for each licensor crypto token 10 based on criteria, such as popularity, rank, demand, and/or usage. Moreover, the at least one licensor apparatus 120 may adjust the price. Also, the token server 110 may automatically adjust the price based on changes in the criteria.

The token server 110 may be an online marketplace, store, and/or auction website. The token server 110 may arrange crypto tokens 10 in multiple categories, such as football, basketball, baseball, hockey, soccer, tennis, rugby, lacrosse, and/or any other logical, practical, or familiar group. Additionally, the crypto tokens 10 may be separated by price and/or type of the digital and/or physical asset. Alternatively, the token server 110 may be a game server that receives connections from the at least one licensor apparatus 120 and/or the at least one licensee apparatus 130.

The input unit 131 may receive an input related to a game and/or a fantasy sport. The processing unit 133 executing the app may determine the input requests use of the at least one licensor crypto token 10, such that the processing unit 133 sends the request from the communication unit 134 to the communication unit 124 and/or the token server 110. More specifically, the at least one licensee apparatus 130 may request use of the at least one licensor crypto token 10 to use the name of the at least one licensor, the image of the at least one licensor, the sport of the at least one licensor, the jersey of the at least one licensor, the sport equipment of the at least one licensor, the signature of the at least one licensor, the video of the at least one licensor, the meme of the at least one licensor, the card of the at least one licensor, the description of the at least one licensor, the voice recording of the at least one licensor, the video recording of the at least one licensor, and/or any unique asset associated with the at least one licensor. Furthermore, the display unit 132 may display a list of each licensor crypto token 10 available on the token server 110.

The input unit 131 may receive a purchase input to purchase the at least one licensor crypto token 10 to be used in the game and/or the fantasy sport played on the token server 110 and/or the at least one licensee apparatus 130. The blockchain 140 may execute smart contracts to automatically resolve an agreement and/or the transaction (i.e., self-executing agreement) in response to receiving the purchase input from the input unit 131 via the communication unit 134. It is important to note that the smart contract terms may be integrated into the at least one licensor crypto token 10 that requires acceptance or rejection to be sold, traded, and/or used by the at least one licensor and/or the at least one licensee. Moreover, the blockchain 140 may ensure through the smart contracts that a predetermined condition (e.g., terms) has been satisfied by the at least one licensee apparatus 130. For example, the blockchain 140 may require the at least one licensee apparatus 130 to agree not to trade, transfer, exchange, and/or sell the at least one licensor crypto token 10 being purchased, such that breaking the agreement may void the transaction and remove privileges to use the at least one licensor crypto token 10, result in ban of further use of the token server 10, and/or acquisition of any crypto tokens 10. The blockchain 140 may update a transaction record at step S120, such that the token server 110 may store the at least one licensor crypto token 10 at step S130. The at least one licensee apparatus 130 may request the at least one licensor crypto token 10 at step S140. The token server 110 may release the at least one licensor crypto token 10 to the at least one licensee apparatus 130 in response to the at least one licensee apparatus 130 accepting the terms of the smart contract at step S150. As such, the at least one licensor apparatus 120 may license use of the at least one licensor crypto token 10 at step S160 for use in the game and/or the fantasy sport.

The blockchain 140 may use additional terms and conditions than standard smart contracts that use conditional programming statements. The blockchain 140 may use smart contracts that follow requirements from the at least one licensor and/or legal requirements for contracts, such as inclusion of option contracts. In other words, the at least one licensee apparatus 130 may indicate a desire to purchase a specific type of the at least one licensor crypto token 10 and notify the at least one licensor apparatus 120 to keep the specific type of the at least one licensor crypto token 10 available for a specified period of time. As such, the at least one licensee apparatus 10 may purchase the option for the at least one licensor apparatus 120 to keep the specific type of the at least one licensor crypto token 10, such that the at least one licensor apparatus 120 and/or the token server 110 may be prevented from selling the specific type of the at least one licensor crypto token 10 during the specified period of time. This type of agreement may be useful for at least one licensee who may not yet have sufficient funds to purchase the at least one licensor crypto token 10.

Also, the at least one licensee apparatus 130 may seek to use the option contract to keep the price for the at least one licensor crypto token 10 at a specific price. For example, the at least one licensee apparatus 130 may pay for the option with the at least one licensor apparatus 120 and/or the token server 110, such that the at least one licensor apparatus 120 and/or the token server 110 may be prevented from adjusting (e.g., increasing, decreasing) the price of the at least one licensor crypto token 10 within the specified period of time. As such, if the option contract is set for a month time frame and the price increased one hundred dollars within the month, the at least one licensor apparatus 130 and/or the token server 110 may be bound to sell the at least one licensor crypto token 10 to the at least one licensee apparatus 130 at the previous price before the price increase. However, the at least one licensor apparatus 120 and/or the token server 110 may adjust the price after the expiration of the specified period of time for the option contract.

For remedies, the blockchain 140 and/or the token server 110 may enforce specific performance (i.e., putting each party to the contract in a position as if the contract were performed) in situations where the at least one licensee apparatus 130 indicates a refund is not sufficient. The blockchain 140 and/or the token server 110 may request an explanation to apply specific performance. For example, the at least one licensee apparatus 130 may notify the token server 110 and/or the blockchain 140 that the at least one licensor apparatus 120 may have declined and/or blocked completion of the sale and/or stopped transfer of use of the license of the at least one licensor crypto token 10 to the at least one licensee apparatus 130. Due to the fact that the at least one licensor crypto token 10 is considered a unique digital asset and/or a unique physical asset, identified by a hash record on the blockchain 140, it cannot be duplicated. As such, the token server 110 and/or the blockchain 140 may confirm that specific performance is required and enforce the agreement by transferring the license to use the at least one licensor crypto token 10 to the at least one licensee apparatus 130.

Furthermore, the blockchain 140 may adopt and/or uses a second routing layer to increase transaction speeds. Specifically, the blockchain 140 may use the second routing layer to have another route of confirming transactions. Also, the blockchain 140 may use larger block sizes (e.g., greater than thirty-two megabytes, such as sixty-four megabytes, one-hundred twenty-eight megabytes, two-hundred fifty-six megabytes, etc.) to reduce transaction fees (e.g., gas) and/or increase the available space for transactions.

The token server 110 may allow use of the at least one licensor crypto token 10 based on an account, a website address, a name, an identifying code, a phone number, a media access control (MAC) address of the at least one licensee apparatus 130, and/or a serial number of the at least one licensee apparatus 130. In other words, the token server 110 may recognize use of the at least one licensor crypto token 10 based on the account of a user on any device and/or for any user that uses the at least one licensee apparatus 130 with an authorized MAC address.

The token server 110 may transfer use of the at least one licensor crypto token 10 to the at least one licensee apparatus 130. In other words, the token server 110 may authorize a use license to the at least one licensee apparatus 130 based on one of the aforementioned connections. The token server 110 may allow lifetime use of the at least one licensor crypto token 10 and/or a predetermined period of time, such as a subscription. More specifically, the token server 110 may request additional charges and/or fees to the at least one licensee apparatus 130 after expiration of the predetermined period of time.

Regardless of the token server 110 method of use for the at least one licensee apparatus 130, the token server 110 may transfer funds and/or royalties to the at least one licensor apparatus 120. In other words, the at least one licensor apparatus 120 may receive monetary compensation based on each licensor crypto token 10 sold, purchased, leased, and/or subscribed for use. Accordingly, the adoption of the at least one licensor crypto token 10 by the at least on licensor may create more opportunities for improvement by making the process more secure, more transparent, and/or more ubiquitous, thereby increasing the revenue and royalty opportunities for the parties involved. By using the crypto tokens to manage the licensure of proxy persons, players or teams, the real persons, players or teams represented by the proxy can benefit from the and activity related to buying, selling, trading and wagering theft proxies for use in games, fantasy sports contests, and/or wagering opportunities Therefore, the royalties may be paid from the token server 110 and/or the crypto and/or asset marketplace in response to acceptance of the smart contract within the at least one licensor crypto token 10 and/or the blockchain 140.

The at least one licensee apparatus 130 may store the at least one licensor crypto token 10 in a digital wallet that may be part of the app and/or a website linked to the token server 110 and/or the blockchain 140. Thereafter, the at least one licensee apparatus 130 may use the at least one licensor crypto token 10 for use based on a preference of the user. For example, the at least one licensee apparatus 130 may use the at least one licensor crypto token 10 to access and/or use a face of the at least one licensor in a video game, download works of digital art created by the at least one licensor, and/or play music created by the at least one licensor.

Therefore, the system 100 provide a recurring monetary benefit for real sports players by licensing use of their assets.

The present general inventive concept may include a system 100 for crypto token linked assets in at least one of a game, a fantasy sport, and a wagering opportunity, the system 100 including a token server 110 storing at least one transaction of at least one licensor crypto token 10 over a network, the token server 110 being programmed to create proof of ownership for at least one of a unique digital asset and a unique physical asset of at least one licensor, analyze the at least one transaction, and associate the at least one licensor to the at least one licensor crypto token 10, at least one licensor apparatus 120 being programmed to generate and distribute the at least one licensor crypto token 10, and send the at least one licensor crypto token 10 to the token server 110, and at least one licensee apparatus 130 being programmed to request use of the at least one licensor crypto token 10 on the token server 110, and obtain a license to use the at least one licensor crypto token 10 in response to completing the at least one transaction.

The token server 110 may be further programmed to receive the at least one licensor crypto token 10 as at least one of a non-fungible token or similar token, and a cryptocurrency.

The at least one licensor apparatus 120 may be further programmed to link the at least one licensor crypto token 10 to at least one of the unique digital asset and the unique physical asset of the at least one licensor.

The digital asset and/or the physical asset linked to the at least one licensor crypto token 10 may be at least one of a name of the at least one licensor, an image of the at least one licensor, a sport of the at least one licensor, a jersey of the at least one licensor, a sport equipment of the at least one licensor, a signature of the at least one licensor, a video of the at least one licensor, a meme of the at least one licensor, a card of the at least one licensor, a description of the at least one licensor, a voice recording of the at least one licensor, a video recording of the at least one licensor, and any unique asset associated with the at least one licensor.

The at least one licensor apparatus 120 may be further programmed to associate a licensor identification with the at least one licensor crypto token 10.

The at least one licensee apparatus 130 may be further programmed to gain access to use at least one of the unique digital asset and the unique physical asset of the at least one licensor in at least one of the game, the fantasy sport, and the wagering opportunity in response to obtaining the license for the at least one licensor crypto token 10.

The token server 110 may be further programmed to automatically set the price for the at least one licensor crypto token 10 based on at least one of popularity, rank, demand, and usage.

The token server 110 may be further programmed to grant use of the at least one licensor crypto token 10 based on at least one of an account, a website address, a name, an identifying code, a phone number, a media access control address, and a serial number of the at least one licensee apparatus 130.

The token server 110 may be further programmed to require a subscription fee for continued use of the at least one licensor crypto token 10 after expiration of a predetermined period of time.

The token server 110 may be further programmed to transfer funds and royalties to the at least one licensor apparatus 120 in response to completion of the at least one transaction between the at least one licensor apparatus 120 and the at least one licensee apparatus 130.

The at least one licensee apparatus 130 may be further programmed to store the at least one licensor crypto token 10 in a digital wallet.

The system 100 may further include a blockchain 140 comprising a plurality of nodes on a distributed network, the blockchain 140 connected to the token server 110, the at least one licensor apparatus 120, and the at least one licensee apparatus 130 and programmed to store the at least one transaction using a cryptographic hash on each of the plurality of nodes.

The blockchain 140 may be further programmed to regulate distribution of the at least one licensor crypto token 10.

The blockchain 140 may be further programmed to execute a smart contract to automatically resolve the at least one transaction.

The blockchain 140 may be further programmed to require the smart contract to adopt legal and the at least one licensor requirements for an option contract, such that the at least one licensor apparatus keeps the at least one licensor crypto token available for the at least one licensee apparatus for a specified period of time in response to the at least one licensor apparatus paying for the specified period of time.

The blockchain 140 may be further programmed to use a second routing layer to increase transaction speeds.

The blockchain 140 may be further programmed to use block sizes larger than thirty-two megabytes to reduce transaction fees and increase available space for transactions.

The blockchain 140 may be further programmed to require the at least one licensee apparatus 130 to accept a predetermined condition prior to resolving the at least one transaction.

The blockchain 140 may be further programmed to require the at least one licensee apparatus 130 making an agreement not to perform at least one of trade, transfer, exchange, and sell the at least one licensor crypto token 10 being purchased.

The blockchain 140 may be further programmed to perform at least one of void the at least one transaction, remove privileges to use the at least one licensor crypto token 10, and ban future use of the token server 110 in response to the at least one licensee apparatus 130 breaking the agreement.

The present general inventive concept may also include a method for using crypto token linked assets in at least one of a game, a fantasy sport, and a wagering opportunity, the method including storing, on a token server 110, at least one transaction of at least one licensor crypto token 10 over a network, the token server 110 being programmed the steps of creating proof of ownership for at least one of a unique digital asset and a unique physical asset of at least one licensor, analyzing the at least one transaction, and associating the at least one licensor to the at least one licensor crypto token 10, generating and distributing, from at least one licensor apparatus 120, the at least one licensor crypto token 10, sending, from the at least one licensor apparatus 120, the at least one licensor crypto token 10 to the token server 110, requesting, from at least one licensee apparatus 130, use of the at least one licensor crypto token 10 on the token server 110, and obtaining, by the at least one licensee apparatus 130, a license to use the at least one licensor crypto token 10 in response to completing the at least one transaction.

The method may further include receiving, via the token server 110, the at least one licensor crypto token 10 as at least one of a non-fungible token or similar token, and a cryptocurrency.

The method may further include linking, via the at least one licensor apparatus 120, the at least one licensor crypto token 10 to at least one of the unique digital asset and the unique physical asset of the at least one licensor.

The digital asset linked to the at least one licensor crypto token 10 may be at least one of a name of the at least one licensor, an image of the at least one licensor, a sport of the at least one licensor, a jersey of the at least one licensor, a sport equipment of the at least one licensor, a signature of the at least one licensor, a video of the at least one licensor, a meme of the at least one licensor, a card of the at least one licensor, a description of the at least one licensor, a voice recording of the at least one licensor, a video recording of the at least one licensor, and any unique asset associated with the at least one licensor.

The method may further include associating, via the at least one licensor apparatus 120, a licensor identification with the at least one licensor crypto token 10.

The method may further include gaining access, via the at least one licensee apparatus 130, to use at least one of the unique digital asset and the unique physical asset of the at least one licensor in at least one of the game, the fantasy sport, and the wagering opportunity in response to obtaining the license for the at least one licensor crypto token 10.

The method may further include automatically setting the price, via the token server 110, for the at least one licensor crypto token 10 based on at least one of popularity, rank, demand, and usage.

The method may further include granting use, via the token server 110, of the at least one licensor crypto token 10 based on at least one of an account, a website address, a name, an identifying code, a phone number, a media access control address, and a serial number of the at least one licensee apparatus 130.

The method may further include requiring, via the token server 110, a subscription fee for continued use of the at least one licensor crypto token 10 after expiration of a predetermined period of time.

The method may further include transferring, via the token server 110, funds and royalties to the at least one licensor apparatus 120 in response to completion of the at least one transaction between the at least one licensor apparatus 120 and the at least one licensee apparatus 130.

The method may further include storing, via the at least one licensee apparatus 130, the at least one licensor crypto token 10 in a digital wallet.

The method may further include storing on a blockchain 140 the at least one transaction using a cryptographic hash on each of the plurality of nodes, such that the blockchain 140 comprises a plurality of nodes on a distributed network, such that the blockchain 140 is connected to the token server 110, the at least one licensor apparatus 120, and the at least one licensee apparatus 130.

The method may further include regulating, via the blockchain 140, distribution of the at least one licensor crypto token 10.

The method may further include executing, via the blockchain 140, a smart contract to automatically resolve the at least one transaction.

The method may further include executing, via the blockchain 140, requiring the smart contract to adopt legal requirements for an option contract, such that the at least one licensor apparatus keeps the at least one licensor crypto token available for the at least one licensee apparatus for a specified period of time in response to the at least one licensor apparatus paying for the specified period of time.

The method may further include using, via the blockchain 140, a second routing layer to increase transaction speeds.

The method may further include using, via the blockchain 140, block sizes larger than thirty-two megabytes to reduce transaction fees and increase available space for transactions.

The method may further include requiring, via the blockchain 140, the at least one licensee apparatus 130 to accept a predetermined condition prior to resolving the at least one transaction.

The method may further include requiring, via the blockchain 140, the at least one licensee apparatus 130 making an agreement not to perform at least one of trade, transfer, exchange, and sell the at least one licensor crypto token 10 being purchased.

The method may further include performing, via the blockchain 140, at least one of void the at least one transaction, remove privileges to use the at least one licensor crypto token 10, and ban future use of the token server 110 in response to the at least one licensee apparatus 130 breaking the agreement.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A system for crypto token linked assets in at least one of a game, a fantasy sport, and a wagering opportunity, the system comprising:
    a token server storing a plurality of licensor crypto tokens and a plurality of transactions associated with the plurality of licensor crypto tokens;
    at least one licensor apparatus;
    at least one licensee apparatus; and
    a blockchain comprising a plurality of computer nodes on a distributed network, wherein the blockchain is connected to the token server, the at least one licensor apparatus, and the at least one licensee apparatus, wherein the blockchain stores the plurality of transactions using a cryptographic hash on each of the plurality of nodes;
    wherein the at least one licensor apparatus is configured to:
        generate at least one licensor crypto token by linking the at least one licensor crypto token with at least one of a first digital asset and a first physical asset of at least one licensor;
        associate a licensor identification of the at least one licensor with the at least one licensor crypto token, wherein the at least one licensor crypto token comprises at least one of the licensor identification and information of the at least one of the first digital asset and the first physical asset; and
        send the at least one licensor crypto token;
    wherein at least one of plurality of the computer nodes of the blockchain is configured to:
        create a block of data associated with the licensor identification;
    wherein the token server is configured to:
        store the at least one licensor crypto token in response to the creation of the block of data of the licensor identification;
        create a proof of ownership for the at least one of the first digital asset and the first physical asset of the at least one licensor using the at least one licensor crypto token;
        analyze at least one transaction of the plurality of the transactions associated with the at least one licensor crypto token;
        associate the at least one licensor to the at least one licensor crypto token based on the licensor identification;
    wherein the at least one licensee apparatus is configured to:
        receive, from at least one licensee, a purchase input to use the at least one licensor crypto token;
    wherein the at least one of plurality of the computer nodes of the blockchain is further configured to:
        execute a smart contract associated with the at least one licensor crypto token to obtain acceptance of licensing terms of the at least one licensor crypto token from the at least one licensee apparatus, wherein the smart contract comprises the licensing terms associated with use of the at least one licensor crypto token;
    wherein the token server is further configured to:
        authorize a license to use the licensor crypto token based on the acceptance of the licensing terms from the at least one licensee apparatus;
    wherein the at least one licensee apparatus is further configured to:
        obtain the license to use the at least one licensor crypto token; and
        with the obtained license, use the at least one of the first digital asset and the first physical asset of the at least one licensor in at least one of the game, the fantasy sport, and the wagering opportunity in response to obtaining the license for the at least one licensor crypto token.

2. The system of claim 1, wherein the token server is further configured to receive the at least one licensor crypto token as at least one of a non-fungible token or similar token, and a cryptocurrency.

3. The system of claim 1, wherein at least one of the first digital asset and the first physical asset linked to the at least one licensor crypto token is at least one of a name of the at least one licensor, an image of the at least one licensor, a sport of the at least one licensor, a jersey of the at least one licensor, a sport equipment of the at least one licensor, a signature of the at least one licensor, a video of the at least one licensor, a meme of the at least one licensor, a card of the at least one licensor, a description of the at least one licensor, a voice recording of the at least one licensor, a video recording of the at least one licensor, and any unique asset associated with the at least one licensor.

4. The system of claim 1, wherein the token server is further configured to automatically set the price for the at least one licensor crypto token based on at least one of popularity, rank, demand, and usage.

5. The system of claim 1, wherein the token server is further configured to grant use of the at least one licensor crypto token based on at least one of an account, a website address, a name, an identifying code, a phone number, a media access control address, and a serial number of the at least one licensee apparatus.

6. The system of claim 1, wherein the token server is further configured to require a subscription fee for continued use of the at least one licensor crypto token after expiration of a predetermined period of time.

7. The system of claim 1, wherein the token server is further configured to transfer funds and royalties to the at least one licensor apparatus in response to completion of the at least one transaction between the at least one licensor apparatus and the at least one licensee apparatus.

8. The system of claim 1, wherein the at least one licensee apparatus is further configured to store the at least one licensor crypto token in a digital wallet.

9. The system of claim 1, wherein the at least one of plurality of the computing nodes of the blockchain is further configured to regulate distribution of the at least one licensor crypto token.

10. The system of claim 1, wherein the at least one of plurality of the computing nodes of the blockchain is further configured to execute the smart contract to automatically resolve the at least one transaction.

11. The system of claim 10, wherein the at least one of plurality of the computing nodes of the blockchain is further configured to require the smart contract to adopt legal and the at least one licensor requirements for an option contract, wherein the at least one licensor apparatus keeps the at least one licensor crypto token available for the at least one licensee apparatus for a specified period of time in response to the at least one licensor apparatus paying for the specified period of time.

12. The system of claim 1, wherein the at least one of plurality of the computing nodes of the blockchain is further configured to use a second routing layer to increase transaction speeds.

13. The system of claim 1, wherein the at least one of plurality of the computing nodes of the blockchain is further configured to use block sizes larger than thirty-two megabytes to reduce transaction fees and increase available space for transactions.

14. The system of claim 1, wherein the at least one of plurality of the computing nodes of the blockchain is further configured to require the at least one licensee apparatus to accept a predetermined condition prior to resolving the at least one transaction.

15. The system of claim 14, wherein the at least one of plurality of the computing nodes of the blockchain is further configured to require the at least one licensee apparatus making an agreement not to perform at least one of trade, transfer, exchange, and sell the at least one licensor crypto token being purchased.

16. The system of claim 14, wherein the at least one of plurality of the computing nodes of the blockchain is further configured to perform at least one of void the at least one transaction, remove privileges to use the at least one licensor crypto token, and ban future use of the token server in response to the at least one licensee apparatus breaking the agreement.

17. A method for using crypto token linked assets in at least one of a game, a fantasy sport, and a wagering opportunity with a system comprising a token server, at least one licensor apparatus, at least one licensee apparatus and a blockchain connecting to the token server, the at least one licensor apparatus and the at least one licensee apparatus, wherein the blockchain comprises a plurality of computer nodes on a distributed network, the method comprising:

storing, by the token server, a plurality of licensor crypto tokens and a plurality of transactions associated with the plurality of licensor crypto tokens;

storing, by the blockchain, the plurality of transactions using a cryptographic hash on each of the plurality of nodes;

generating, by the at least one licensor apparatus, at least one licensor crypto token by linking the at least one licensor crypto token with at least one of a first digital asset and a first physical asset of at least one licensor;

associating, by the licensor apparatus, a licensor identification of the at least one licensor with the at least one licensor crypto token, wherein the at least one licensor crypto token comprises at least one of the licensor identification and information of the at least one of the first digital asset and the first physical asset;

sending, by the at least licensor apparatus, the at least one licensor crypto token;

creating, by at least one of plurality of the computer nodes of the blockchain, a block of data associated with the licensor identification;

storing, by the token server, the at least one licensor crypto token in response to the creation of the block of data of the licensor identification;

creating, by the token server, a proof of ownership for the at least one of the first digital asset and the first physical asset of the at least one licensor using the at least one licensor crypto token;

analyzing, by the token server, at least one transaction of the plurality of the transactions associated with the at least one licensor crypto token;

associating, by the token server, the at least one licensor to the at least one licensor crypto token based on the licensor identification;

receiving, by the licensee apparatus from at least one licensee, a purchase input to use the at least one licensor crypto token;

executing, by the blockchain, a smart contract associated with the at least one licensor crypto token to obtain acceptance of licensing terms of the at least one licensor crypto token from the at least one licensee apparatus, wherein the smart contract comprises the licensing terms associated with use of the at least one licensor crypto token;

authorizing, by the token server, a license to use the licensor crypto token based on the acceptance of the licensing terms from the at least one licensee apparatus;

obtaining, by the at least one licensee apparatus, the license to use the at least one licensor crypto token; and with the obtained license, using, by the at least one licensee apparatus, the at least one of the first digital asset and the first physical asset of the at least one licensor in at least one of the game, the fantasy sport, and the wagering opportunity in response to obtaining the license for the at least one licensor crypto token.

18. The method of claim 17, further comprising receiving, by the token server, the at least one licensor crypto token as at least one of a non-fungible token or similar token, and a cryptocurrency.

19. The method of claim 17, wherein at least one of the first digital asset and the first physical asset linked to the at least one licensor crypto token is at least one of a name of the at least one licensor, an image of the at least one licensor, a sport of the at least one licensor, a jersey of the at least one licensor, a sport equipment of the at least one licensor, a signature of the at least one licensor, a video of the at least one licensor, a meme of the at least one licensor, a card of the at least one licensor, a description of the at least one licensor, a voice recording of the at least one licensor, a video recording of the at least one licensor, and any unique asset associated with the at least one licensor.

20. The method of claim 17, further comprising automatically setting the price, by the token server, for the at least one licensor crypto token based on at least one of popularity, rank, demand, and usage.

21. The method of claim 17, further comprising granting use, by the token server, of the at least one licensor crypto token based on at least one of an account, a website address, a name, an identifying code, a phone number, a media access control address, and a serial number of the at least one licensee apparatus.

22. The method of claim 17, further comprising requiring, by the token server, a subscription fee for continued use of the at least one licensor crypto token after expiration of a predetermined period of time.

23. The method of claim 17, further comprising transferring, by the token server, funds and royalties to the at least one licensor apparatus in response to completion of the at least one transaction between the at least one licensor apparatus and the at least one licensee apparatus.

24. The method of claim 17, further comprising storing, by the at least one licensee apparatus, the at least one licensor crypto token in a digital wallet.

25. The method of claim 17, further comprising regulating, by the blockchain, distribution of the at least one licensor crypto token.

26. The method of claim 17, further comprising executing, by the blockchain, the smart contract to automatically resolve the at least one transaction.

27. The method of claim 26, further comprising executing, by the blockchain, requiring the smart contract to adopt legal and the at least one licensor requirements for an option contract, wherein the at least one licensor apparatus keeps the at least one licensor crypto token available for the at least one licensee apparatus for a specified period of time in response to the at least one licensor apparatus paying for the specified period of time.

28. The method of claim 17, further comprising using, by the blockchain, a second routing layer to increase transaction speeds.

29. The method of claim 17, further comprising using, by the blockchain, block sizes larger than thirty-two megabytes to reduce transaction fees and increase available space for transactions.

30. The method of claim 17, further comprising requiring, by the blockchain, the at least one licensee apparatus to accept a predetermined condition prior to resolving the at least one transaction.

31. The method of claim 30, further comprising requiring, by the blockchain, the at least one licensee apparatus making an agreement not to perform at least one of trade, transfer, exchange, and sell the at least one licensor crypto token being purchased.

32. The method of claim 30, further comprising performing, by the blockchain, at least one of void the at least one transaction, remove privileges to use the at least one licensor crypto token, and ban future use of the token server in response to the at least one licensee apparatus breaking the agreement.

* * * * *